United States Patent [19]

Orieux

[11] 4,143,351
[45] Mar. 6, 1979

[54] SONIC DIRECTION FINDER

[75] Inventor: Francois Orieux, Paris, France

[73] Assignee: CSF-Compagnie Generale de Telegraphie Sans Fil, Paris, France

[21] Appl. No.: 369,324

[22] Filed: May 21, 1964

[30] Foreign Application Priority Data

May 21, 1963 [FR] France .................. 935.491

[51] Int. Cl.$^2$ .................. G01S 3/80; G01S 3/84
[52] U.S. Cl. .................. 340/6 R; 340/16 P; 343/113 DE
[58] Field of Search .................. 343/16, 113, 113.2, 343/114.5, 115, 118, 120, 113.1, 16 R, 113 DE; 340/6, 16, 6 R, 16 R

[56] References Cited

U.S. PATENT DOCUMENTS

| | | | |
|---|---|---|---|
| 2,728,910 | 12/1955 | Fewings et al. | 343/118 X |
| 2,767,386 | 10/1956 | Ross | 340/6 |
| 2,866,967 | 12/1958 | Bernbaum | 340/6 X |
| 2,961,636 | 11/1960 | Benecke | 340/6 X |
| 3,105,193 | 9/1963 | Denton | 324/82 |
| 3,108,251 | 10/1963 | Corbett | 340/6 X |
| 3,115,633 | 12/1963 | Kramar et al. | 343/106 |
| 3,181,159 | 4/1965 | Kramar et al. | 343/118 X |

Primary Examiner—Richard A. Farley
Attorney, Agent, or Firm—Cushman, Darby & Cushman

EXEMPLARY CLAIM

1. A direction finding system for determining the direction from which short sonic or ultrasonic pulses are incoming, comprising: a plurality of electroacoustic transducers forming a circular arrangement; electronic means for sequentially switching in and out pairs of diametrically opposed transducers; differential means having two inputs, respectively connected by said electronic means to said switched-in transducers, and an output for providing the differential output signal of each of said pairs; and means for deriving the phase of said output signal.

9 Claims, 11 Drawing Figures

SONIC DIRECTION FINDER

The present invention relates to sonic or ultrasonic direction finding systems and more particularly to systems for determining the direction from which short ultrasonic pulses, whose carrier frequency ranges from about 20 Kc up to about 100 Kc, are incoming.

To this effect it is known, to rotate a direction finding antenna and to compare the phase of the low frequency amplitude modulating signal received with a signal of the same frequency and predetermined phase.

However, such a method is inadequate with short pulses, since the high rotation speed required to modulate in amplitude these signals can hardly be achieved.

It is an object of the invention to provide a direction finding system of the above type wherein the antenna is not actually rotated.

According to the invention a low frequency modulation in amplitude of the incoming signal is obtained by substituting for a rotating antenna a circular array of electroacoustic transducers such as, for example, hydrophone dipoles, which are in turn and periodically switched in and out with a speed high enough to insure the modulation of the incoming pulses.

The invention will be best understood from the following specification and appended drawings wherein.

The invention will be described in the case of a hydrophone array but of course other electroacoustical transducers can be used within the framework of the invention.

Figure 1:
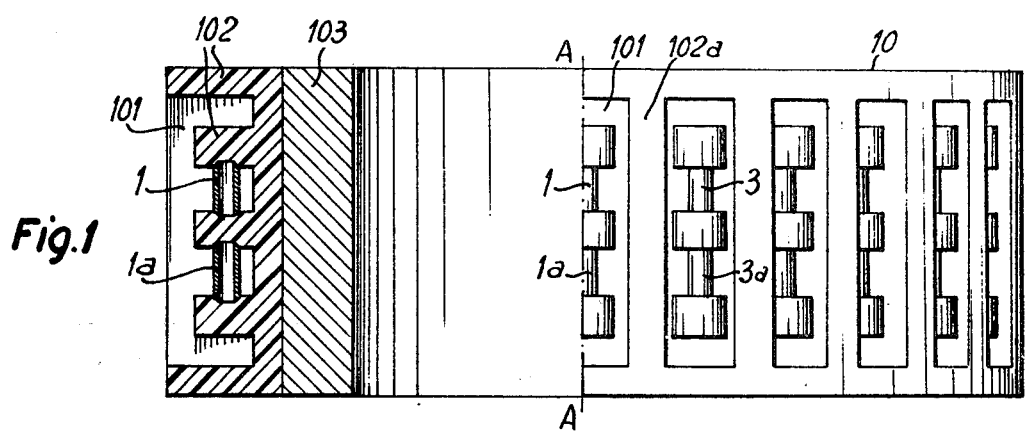
FIG. 1 shows, in perspective and partly in section, a circular arrangement of hydrophone according to the invention.

The circular arrangement 10 of hydrophones dipoles shown in FIG. 1 comprises n dipoles, n being, for example, equal to 30.

The hydrophones are, for example, built up by tubes of ceramic material, for example, of lead titanate or zirconate, which insure a fairly good sensitivity throughout the ultrasonic frequency range considered. The first resonant frequency is obtained as a function of this range. For example, in the 20 Kc to 100 Kc band the resonant frequency will be 150 Kc.

Each hydrophone comprises a pair of coaxial tubes 1 and 1a, positioned within a recess 101 formed in a wall 102 of a transducer carrier or head made of material capable of absorbing sonic and ultrasonic waves, and having a good physical strength, such as, for example, polyethylen.

Recesses 101 are regularly spaced along a circle about an axis AA, such that a rotation by 12°, for example, if n = 30, about this axis, brings each recess and each dipole in the position previously occupied by the adjacent recess and dipole.

The absorbing wall 102 is mounted on a cylindrical, wheel shaped body 103, which can be, for example, of bronze.

The fact that pairs of tubes 1 and 1a are located on the same vertical confers a good directivity to the dipole in the vertical plane. This directivity will be such that there will be more than 6db attenuation for a shift of ±20° from the directivity axis, for ultra sounds ranging up to 100 Kc.

Figure 2:
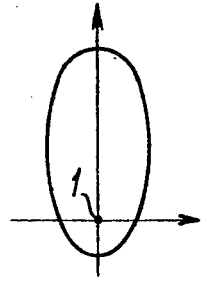
FIGS. 2 and 3 are respectively radiation patterns of a hydrophone and of a dipole used in a system according to the invention.

FIG. 2 shows the radiation lobe of one hydrophone in the horizontal plane. This diagram shows a rather sharp maximum in the plane passing through the AA axis and the vertical axis of the hydrophone considered. This in due to the attenuation of sounds propagating in other directions by the vertical walls 102a of the recesses 101. The directivity pattern will be obtained by suitably selecting the depth and the aperture of the recesses.

The two hydrophones 1-1a and 2-2a (not seen) making up a dipole, are diametrically opposed in the circular hydrophone arrangement, so that their respective radiation patterns are in opposite directions.

Figure 3:
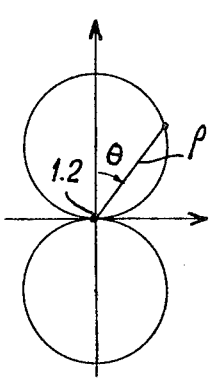
Figure 4:
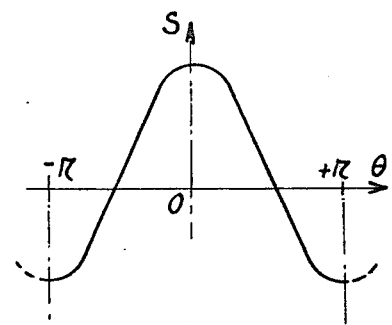
FIGS. 4 and 5 are plots showing the variation of the differential signal amplitude at the output of a dipole as a function of the azimuth variation and of time respectively.

FIGS. 3 and 4 show, respectively in polar and cartesian coordinates, the variation as a function of the azimuth $\theta$, of the difference between signals obtained at the respective outputs of the two hydrophones of the same dipole. The curve of FIG. 4 is sinusoidal with a period $2\pi$, which corresponds to suitably selected dimensions of the recess 102, wherein the hydrophones of the dipole considered are located. What would happen to the diagram of FIG. 4 if these dimensions were such that the directivity would be too low, is illustrated in FIG. 6.

Figure 7:
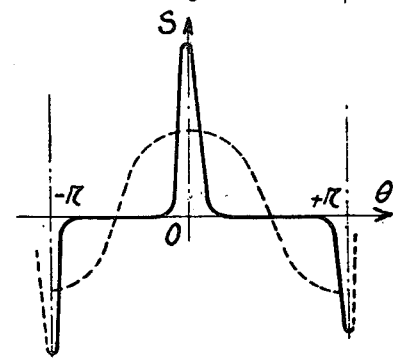

FIG. 7 shows the curve which would be obtained for an extremely sharp directivity, which can be found advantageous in some applications.

Figure 6:
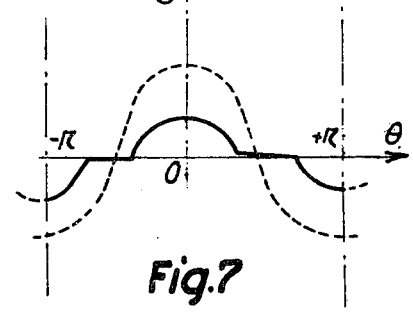
FIGS. 6 and 7 show the signal as a function of the azimuth when the directivity is too low and too high.

It has been assumed with respect to FIGS. 4, 6 and 7 that the azimuth $\theta$ of the source varies with respect to a fixed dipole.

Figure 5:
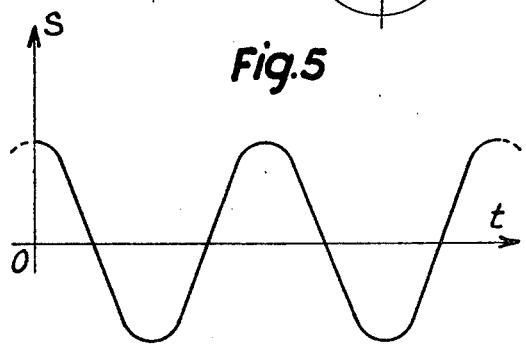

If now the dipole is made to rotate at a constant speed about the vertical axis AA, while the source is stationary in azimuth, the diagram of FIG. 5 is obviously obtained for each dipole corresponding to FIG. 4. The ordinate of the diagram goes to zero, during each rotation of the dipole when the azimuth of the source becomes equal to 90°. As is well known in direction finding techniques, it will suffice to define the instants when the received signal is zero by decreasing the values of the differential output signal of the dipole, to define the azimuth of the source with no need of resorting to sense bearing procedures.

This of course is not true of the patterns of FIGS. 6 and 7.

However, the pattern of FIG. 7 shows a maximum which is fairly well defined in time, although less precisely than the moment of the cancellation of the signal in the pattern of FIG. 4. This maximum can then be used for a first coarse determination of the direction of the source. In addition, in accordance with a well known direction finding technique, the higher harmonics of the dipole rotation frequency contained in the received signal and whose level is relatively high may be used for more precisely defining the direction of the source, while resorting in addition to known sense bearing getting techniques.

Figure 8:
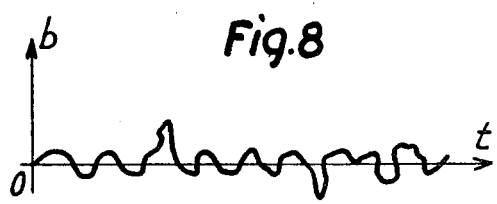
FIG. 8 shows the signal in the absence of the source.

FIG. 8 shows the output signal when only noise is received.

Figure 9:
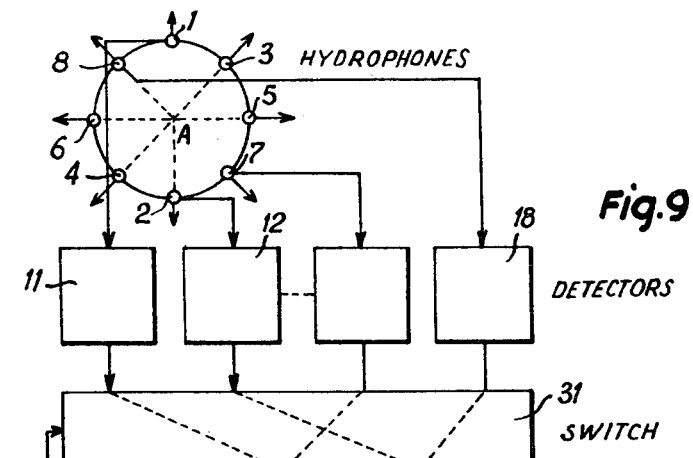
FIG. 9 is a block diagram of a receiver according to the invention.

FIG. 9 shows a direction finding system according to the invention.

The system comprises a number n of hydrophone pairs 1-2 to 7-8, which is high enough to simulate the continuous rotation of a single dipole by switching in and out the dipoles in turn. Only four hydrophone pairs are shown for simplification in FIG. 9. In fact this number will be much higher, say for example 30 hydrophones pairs, i.e. 30 dipoles.

Each hydrophone, such as 1, 2, ... 8, is followed by a preamplifier and by a small time constant detector, each preamplifier and detector assembly being shown in FIG. 9 by one block such as 11, 12, ... 18.

An electronic switch 31 of any suitable known type periodically couples the respective outputs of the two detectors of the same dipole to the inputs of a differential amplifier 32, followed by a pass-band filter 33, centered on the repetition frequency f of the switching cycles.

A clock system 30 provides n switching signals, during each switching cycle, to switch 31. Accordingly, the frequency of these signals is nf. On the other hand, a signal generator circuit 34, derives from clock 30 a square wave reference signal whose frequency is f. The output signal from filter 33 is compared in phase with the reference signal in a first phasemeter 35 and with the same signal, previously delayed by $\pi/2$ by a phase shifter 36, in a second phasemeter 37.

Phasemeters 35 and 37 receive the sine wave signal and the square wave reference signal having a predetermined phase, the two signals having the same frequency, and provide an average voltage varying as the cosine of the phase between the sinusoidal signal and the reference signal, i.e. as $\cos \theta$ and $\cos (\theta - \pi/2)$ i.e. $\sin \theta$. They are built up, for example, by well known Hall elements, comprising a germanium plate which is submitted to the action of the orthogonal magnetic field set up by the sinusoidal output current of filter 33, and through which flows the square wave signal from circuits 34 or 36. At the output terminals of the Hall elements are then collected average currents respectively proportional to $\cos \theta$ and $\sin \theta$.

Figure 10:
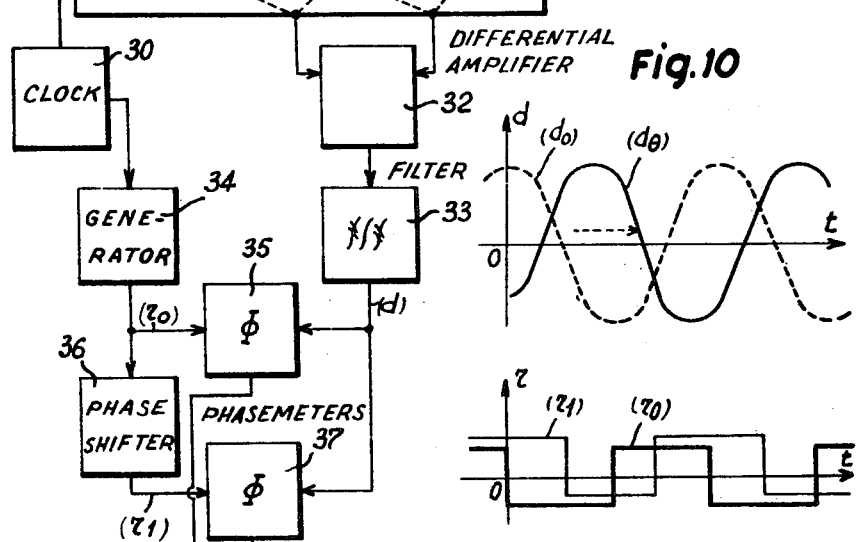
FIG. 10 shows the signal relative phase shifts.

FIG. 10 shows the differential signal $d_0$ corresponding to $\theta = 0$, as received by the dipoles of the arrangement assuming that there are enough dipoles for the signal to be received practically without interruption.

The same figure shows the reference square signals $r_0$ and $r_1$.

If $\theta$ varies, the differential signal curve is shifted along the time axis by the time necessary for switching from the dipole located in the direction of a source for $\theta = 0$ to the dipole located in the direction of the source for the fresh value of $\theta$.

It may shown that the output voltage of phasemeter 35 will be proportional to $\cos \theta$ provided signal d closely approximates a sinusoid, while the output of phase meter 37 will vary as $\sin \theta$, because of the $\pi/2$ phaseshift between $r_1$ and $r_0$.

In order for signal d to be sinusoidal, the directivity of the dipole must be as shown in FIG. 4 and as described above, which is obtained by suitably selecting the depth of recesses 101 as a function of their aperture. Furthermore frequency f has to be the only frequency present in the detected differential signal. The higher frequencies, such as frequency nf, or the harmonics of the fundamental frequency having a substantial level are to be attenuated. This is done by means of passband filter 33, which must be very efficient.

This filter centered on frequency f, for example 10 Kc/s will have to be as narrow as possible, say ± 500 c/s, this width being determined as a function of the shortest pulse to be received.

The result obtained is independent of the incoming signal frequency, which can be, for example, higher than 20 Kc and/or vary in time, for example as a result of a modulation, without this affecting the measurement.

Figure 11:
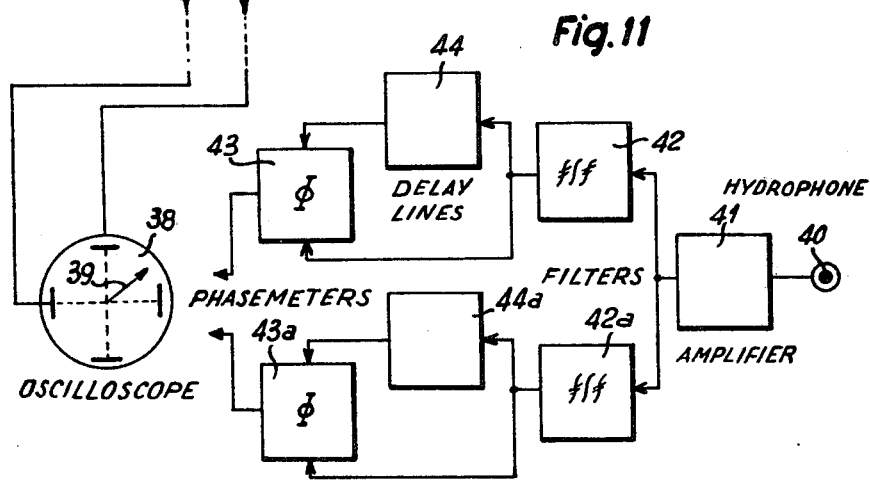
FIG. 11 is a block diagram of a frequency meter for a receiver according to the invention.

FIG. 11 shows by way of example a frequency meter arrangement which may be added to a system according to the invention.

The incoming sonic signals are picked up by an omnidirectional hydrophone 40, amplified by an amplifier 41, and filtered in one or more passband filters, covering the incoming signal band of frequencies.

For example, if the band to be received ranges from 20 Kc/s to 80 Kc/s, two filters 42 and 42a will be used, their respective passbands extending from 20 Kc/s to 40 Kc/s and from 40 Kc/s to 80 Kc/s.

The respective output signals from filters 42 and 42a are applied to phasemeters 43 and 43a, once directly and once through respective delay lines 44 and 44a, which impress on the signals respective delays $\tau$ and $\tau a$.

The output voltages of phasemeters 43 or 43a are proportional to $2\pi F \tau$ and $2\tau F \tau a$, thereby yielding a measurement of frequency F.

The delay lines will be so selected that the phaseshift should be $\pi$ for the maximum value of frequency F. By way of example, $\tau$ may be made equal to $1.25 \cdot 10^{-5}$ for a frequency band from 20 to 40 Kc/s.

The indicator 38 shown in FIG. 9 may be used for indicating simultaneously azimuth $\theta$, which is represented by the argument of vector 39 and frequency F represented by the modulus of this vector.

Various procedures may be used to this effect. For example, the input voltage of phasemeters 35 and 37 may be multiplied by a magnitude representing frequency F measured by the frequency-meter. The output of phasemeters 35 and 37 will then be proportional to $F \cos \theta$ and $F \sin \theta$.

If dipoles having a directivity, as shown in FIG. 7, much higher than that corresponding to FIG. 4, are used, the receiver will incorporate a phaseshift measurement device on the fundamental, for providing a coarse sense bearing measurement and as many phaseshift measurement devices as there are harmonics used to obtain the desired precision.

Of course the invention is not limited to the embodiments described and shown which were given solely by way of example.

What is claimed is:

1. A direction finding system for determining the direction from which short sonic or ultrasonic pulses are incoming, comprising: a plurality of electroacoustic transducers forming a circular arrangement; electronic means for sequentially switching in and out pairs of diametrically opposed transducers; differential means having two inputs, respectively connected by said electronic means to said switched-in transducers, and an output for providing the differential output signal of each of said pairs; and means for deriving the phase of said output signal.

2. A direction finding system for determining the direction from which short sonic or ultrasonic pulses are incoming, comprising: a plurality of electroacoustic transducers forming a circular arrangement; electronic means for sequentially switching in and out pairs of diametrically opposed transducers; differential means having two inputs, respectively connected by said electronic means to said switched-in transducers, and an output for providing the differential output signal of each of said pairs; means for providing a reference signal having a predetermined phase; means for comparing said output signal with said reference signal for deriving the angle defining the direction of said incoming pulses.

3. A direction finding system for determining the direction from which short sonic or ultrasonic pulses are incoming, comprising: a plurality of electroacoustic transducers forming a circular arrangement; electronic means for sequentially switching in and out pairs of diametrically opposed transducers; differential means having two inputs, respectively connected by said electronic means to said switched-in transducers, and an output for providing the differential output signal of each of said pairs; means for providing a first and a second reference signal, each having a predetermined phase; means for comparing said output signal with said first and said second signals for deriving therefrom the sine and the cosine of the angle defining the direction of said incoming pulses; and means for displaying said angle.

4. A direction finding system for determining the direction from which short sonic or ultrasonic pulses are incoming, comprising: a plurality of electroacoustic transducers forming a circular arrangement; electronic means for sequentially switching in and out pairs of diametrically opposed transducers; differential means having two inputs, respectively connected by said electronic means to said switched-in transducers, and an output for providing the differential output signal of each of said pairs; a circular transducer carrier comprising a wall of sound absorbing material having recesses wherein said transducers are respectively positioned, the aperture and the depth of said recesses being selected for obtaining a sinusoidal variation of said output signal upon rotation of said transducer carrier with the direction of the incoming pulses remaining stationary; means for providing a first and a second reference signal, each having a predetermined phase; means for comparing said output signal with said first and said second signals for deriving therefrom the sine and the cosine of the angle defining the direction of said incoming pulses; and means for displaying said angle.

5. A direction finding system for determining the direction from which short sonic or ultrasonic pulses are incoming, comprising: an electroacoustic transducer head comprising a circular wall of a material capable of absorbing sound waves and having regularly spaced recesses; pairs of transducers respectively located in said recesses, the transducers of each pair being diametrically opposed; detecting means respectively coupled to said transducers; differential amplifier means; switching means for periodically coupling in turn said transducers of each pair to said differential amplifier for obtaining an output signal; square wave signal generator means providing two reference signals, delayed with respect to each other by $\pi/2$, and phasemeter means coupled to said differential amplifier means and to said generator means for comparing said output signal with said reference signals respectively.

6. A system as claimed in claim 5 wherein said transducers are hydrophones comprising coaxial ceramic tubes whose axes are parallel to the said of said wall.

7. A direction finding system for determining the direction from which short sonic or ultrasonic pulses are incoming, comprising: an electroacoustic transducer head comprising a circular wall of a material capable of absorbing sound waves and having regularly spaced recesses; pairs of transducers respectively located in said recesses, the transducers of each pair being diametrically opposed; detecting means respectively coupled to said transducers; differential amplifier means; switching means for periodically coupling in turn said transducers of each pair to said differential amplifier for obtaining an output signal; the respective apertures of said recesses and the dimension normal to said aperture being selected in such a manner that said output signal is sinusoidal if said transducer pairs are in turn switched in and out for a fixed direction of the incoming pulses; generator means providing two reference signals, delayed with respect to each other by $\pi/2$; and phasemeter means coupled to said generator means for comparing said output signal with said reference signals respectively.

8. A direction finding system for determining the direction from which short sonic or ultrasonic pulses are incoming, comprising: an electroacoustic transducer head comprising a circular wall of a material capable of absorbing sound waves and having regularly spaced recesses; pairs of transducers respectively located in said recesses, the transducers of each pair being diametrically opposed; detecting means respectively coupled to said transducer; differential amplifier means; switching means for periodically coupling in turn said transducers of each pair to said differential amplifier for obtaining an output signal; square wave signal generator means providing a first and a second square wave reference signal delayed with respect to each other by $\pi/2$; first and second phasemeter means for comparing said output signal with said first and second reference signals; and displaying means coupled to said phasemeters.

9. A system according to claim 8 further including a frequency metering system comprising: a further electroacoustical transducer; filtering means coupled to said transducer; further phasemetering means having a first input coupled to said filtering means and a second input; and delay means coupled to said filtering means and to said second input.

* * * * *